United States Patent [19]

Portmann

[11] 4,145,872

[45] Mar. 27, 1979

[54] ELECTRONIC WATCH

[75] Inventor: Hubert Portmann, Colombier, Switzerland

[73] Assignee: Ebauches SA, Neuchatel, Switzerland

[21] Appl. No.: 760,511

[22] Filed: Jan. 19, 1977

[30] Foreign Application Priority Data

Jan. 19, 1976 [CH] Switzerland .................... 561/76

[51] Int. Cl.$^2$ ............................................. G04C 3/00
[52] U.S. Cl. .................... 58/23 R; 58/23 A; 58/23 BA; 58/23 AC; 307/264
[58] Field of Search ............ 58/23 A, 23 BA, 23 AC, 58/23 R; 307/264, DIG. 1

[56] References Cited
U.S. PATENT DOCUMENTS

| | | |
|---|---|---|
| 3,757,510 | 9/1973 | Dill ........................................ 58/23 R |
| 3,946,550 | 3/1976 | Fujita .................................... 58/23 BA |
| 3,950,940 | 4/1976 | Nishimura ...................... 307/DIG. 1 |
| 4,009,565 | 3/1977 | Courier de Mere ............ 58/23 AC |
| 4,029,973 | 6/1977 | Kobayashi .......................... 58/23 A |
| 4,061,929 | 12/1977 | Asano ................................. 58/23 BA |
| 4,068,295 | 1/1978 | Portmann ......................... 58/23 BA |

*Primary Examiner*—Robert K. Schaefer
*Assistant Examiner*—Leonard W. Pojunas, Jr.
*Attorney, Agent, or Firm*—Imirie, Smiley & Guay

[57] ABSTRACT

An electronic battery-powered watch including an oscillator followed by a chain of frequency divider stages, said chain being composed of two parts with an interface circuit between said two parts, said interface circuit multiplying by a predetermined amount the voltage of the battery and the amplitude of the pulses issued from the last stage of the first part of the division chain in order to feed and control the second part of the chain and the decoding and display circuits of the watch.

10 Claims, 5 Drawing Figures

ELECTRONIC WATCH

BACKGROUND OF THE INVENTION

The present invention concerns an electronic watch comprising an oscillator delivering pulses to the input of a frequency division chain composed of two parts, and decoding circuits and display circuits and a source of electrical energy. One of the poles of the source is connected to the ground of the watch and furnishes and initial continuous voltage intended to feed at least the oscillator and the first part of the division chain.

In electronic watch circuits of the C-MOS type ("complementary MOSFET"), it is preferable to operate the oscillator and the first division stages at a low logic level which corresponds to the battery voltage. Weak excitation of the quartz is obtained in this manner, thus ensuring good frequency stability, on the other hand, the losses in the divider, which are proportional to the frequency and to the square of the voltage, remain minimum.

However, the output stages should, in many cases, operate at higher voltages, the value of which depends on the display device. In those cases, an interface is necessary which must be able to be controlled by the low amplitude signals delivered by the first part of the divider chain and furnish signals of greater amplitude capable of controlling the rest of the circuit working at a higher voltage. The chief problems raised by these interface circuits are the cost and the reliability. In fact, some parameters of the transistors composing them should be closely monitored, in the absence of which current consumption becomes excessive.

The object of the present invention therefore is a watch of the above-mentioned type in which the interface stage is particularly sure and reliable. The parameters of the transistors of which it is composed are not subjected to any special constraints, whilst they ensure a reduced current consumption.

SUMMARY OF THE INVENTION

The watch according to the present invention includes an interface circuit interposed between the first and the second part of the frequency division chain. The interface circuit comprises, on the one hand, a voltage multiplier controlled by a first signal, issuing from the first part of the division chain and having an amplitude equal to the said first voltage, and delivers at its output a second continuous voltage, greater than the first continuous voltage supplied by the source and intended to feed the second part of the division chain and the decoding and display circuits and, on the other hand, an output circuit, fed by the second continuous voltage and the output of which supplies a second signal, in the same direction as the said first signal for controlling the voltage multiplier, and having an amplitude equal to the said second continuous voltage, intended to control the second part of the division chain.

An embodiment of the watch according to the present invention will now be described hereinafter with reference to the accompanying drawings.

DETAILED DESCRIPTION

Figure 1:
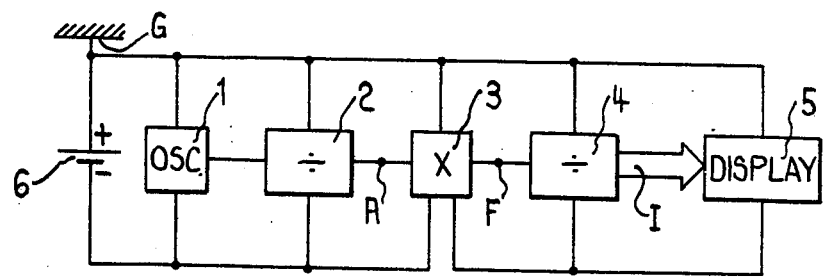
FIG. 1 is a block diagram of a watch according to the present invention.

With reference to FIG. 1, a block diagram of an electronic watch is shown provided with a quartz oscillator 1 followed by a number of divider stages which form a first part 2 of a division chain. These components are fed by a continuous voltage source 6 which is generally formed by a battery supplying a voltage $U_p$ of 1.35V, for example. The pulses A issuing from this first part 2 are supplied to an interface 3 which transforms these low amplitude pulses into high amplitude pulses. The interface 3 in turn supplies a second part 4 of the division chain which supplies coded information I to the decoding and display circuits 5.

Thus, the interface 3 is interposed in the division chain of the watch. In fact, if it is of advantage to operate the first stages of the divider at low voltages, these advantages disappear for relatively low frequencies (below 1kHz). This stems from the fact that static consumption becomes, at low frequency, greater than the losses due to switching operations.

Figure 2:
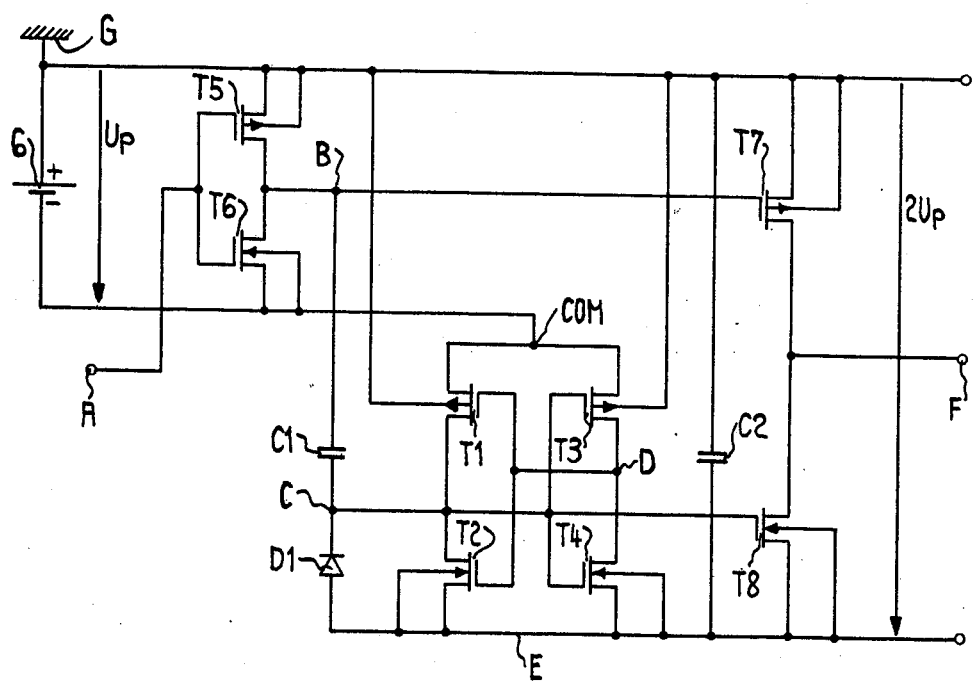
FIG. 2 shows a detailed interface of the watch according to FIG. 1.

FIG. 2 shows an embodiment of the interface 3 which comprises a voltage multiplier, receiving pulses from the first part 2 of the division chain, and comprising, an input stage formed by transistors T5 and T6, and a capacitive multiplication cell. This cell comprises a switching stage, formed by transistors T1 and T2 which, by way of the input stage and an auxiliary stage, formed by the transistors T3 and T4, connect a capacitor C1, sometimes in parallel with with the source 6, sometimes in series with this source 6 and an output capacitor C2, to the terminals, from which capacitor C2 a voltage is available, equal to $2 \times U_p$. This voltage is employed to feed the last stages of the division chain and the decoding and display circuits. The diode D1 is used to ensure the starting of the device.

Figure 3:
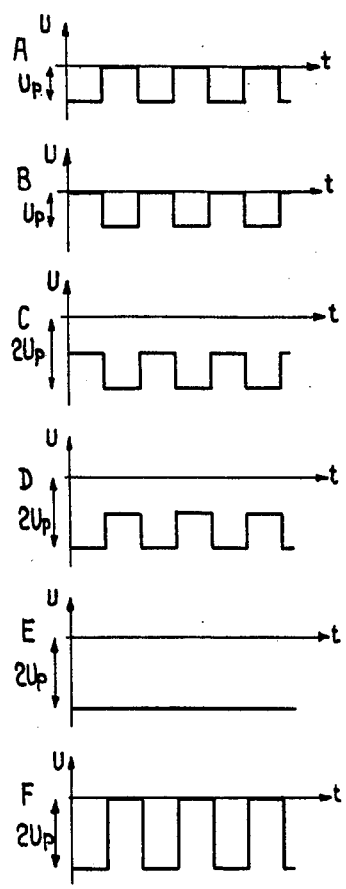
FIG. 3 illustrates the operation of the interface according to FIG. 2.

FIG. 3 shows the forms of the signals at the points A - F of FIG. 2. The transistors T5 and T6 are of large dimensions relatively to the transistors T1 and T2 so that these latter transistors have no excessive influence on the form of the signals at the points B and C during switching operations.

The interface also comprises a rather special inverter, formed by the transistors T7 and T8. This inverter is fed by the output voltage of the multiplier, between the ground G and the point E, the transistor T7, of p-type, has its source connected to ground G and its gate is controlled by the pulses B. The transistor T8 has its source connected to the point E and its gate is controlled by the pulses C. In this manner, pulses are obtained at the output F, the length and frequency of which are the same as those of the pulses A, but the amplitude of which is twice as much. Each transistor T7, T8 is controlled by a gate-source voltage which is alternately zero (thus ensuring blocking thereof) or equal to $U_p$ in the direction which makes it conductive.

The transistors T1, T3, T5 and T7 are of p-type. Their common substrate is connected to ground G. The transistors T2, T4, T6 and T8 are of n-type and they are provided in cases embedded in the substrate of the circuit. These cases are connected to the negative terminal of the battery for the transistor T6, and to the point E for the transistors T2, T4 and T8.

It may be that the signal C is not satisfactory for the control of the transistor T8, because of the voltage drops in the transistors T1 and T2. It is then possible to utilise the pulses D, because, since the transistors T3 and T4 do not have to supply a high current, the signals they supply are more "suitable". However, the transistor T7 will then have to be controlled by a signal which is the inverse of signal B, for example, the pulses A.

Figure 4:
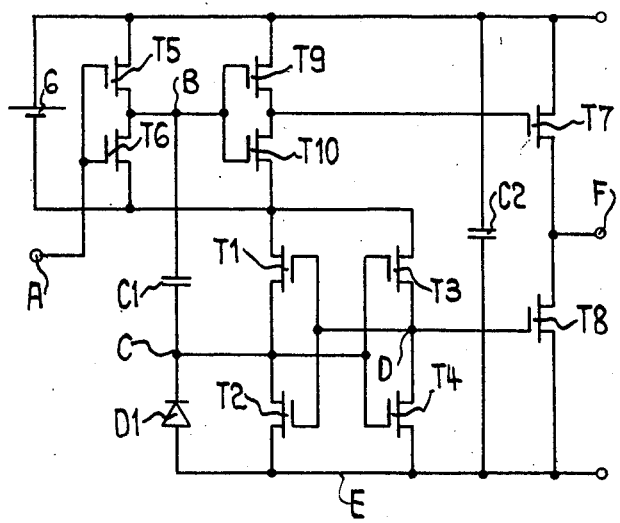
FIGS. 4 and 5 show two other variants of the interface.

In that case, however, there is a short delay of pulses D relative to pulses A, but this should not be of any account. To compensate this, despite the delay, an auxiliary inverter of purely conventional type may be employed, fed by the voltage $U_p$ of the battery, receiving the pulses P and controlling the transistor T7, as shown in FIG. 4. This would provide the pulses controlling the transistor T7 with approximately the same delay, relative to the pulses A, as that of the pulses D.

Figure 5:
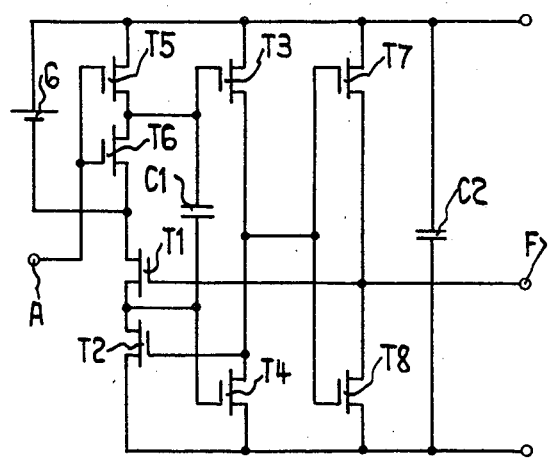

FIG. 5 shows another embodiment of the interface in which the transistor T3 of the auxiliary stage of the multiplication cell has its source directly connected to ground G and its gate connected to the output of the input stage T5, T6. In this case, both transistors of the switching stage are of n-type. The gate of the first, T1, is connected to the output of the interface and the gate of the second, T2, is connected to the output of the auxiliary stage. This system has the advantage of ensuring the starting of the device without a diode in parallel with T2 and guaranteeing that the transistors T7 and T8 are controlled exactly at the same time.

It is obvious that the number of voltage multiplying cells may be, within reasonable limits, as desired. The polarity of the system may also be the reverse of the one selected in our example. As to the frequency of the pulses A, this may be selected between some tens of Hz and some kHz. These limits are imposed, on the one hand, by the value (and hence the dimension) of the capacitors C1 and C2, and on the other hand, by the increase of consumption due to interfering capacitances, the first value being inversely, and the second, directly proportional to the frequency.

It may also be noted that it is not necessary for the voltage multiplier to be capacitive. An inductive voltage multiplier could also be used.

We claim:

1. A battery-powered electronic watch comprising an oscillator followed by a chain of N frequency divider stages, and circuits controlling the display means, said watch further comprising an interface circuit inserted in said chain behind K divider stages associated with said oscillator, wherein K is less than N, said interface circuit being fed by the battery and controlled by pulses issuing from said $K^{th}$ divider stage, said interface circuit multiplying the voltage of the battery and the amplitude of said pulses from said $K^{th}$ divider stage by a predetermined amount to feed and control the other (N-K) stages of said chain as well as said control circuits.

2. An electronic watch as claimed in claim 1, in which the said interface circuit comprises a voltage multiplier circuit and an output circuit.

3. An electronic watch according to claim 2, in which the said output circuit is formed of two MOS transistors, the source of the first of the said transistors being connected to ground of the watch, and the source of the second of the said transistors being connected to the output of the said voltage multiplying circuit, the drains of these two transistors being connected together and forming the output connection of the said interface circuit.

4. An electronic watch according to claim 2, in which the said voltage multiplier circuit comprises an input stage and at least one capacitive multiplication cell, each cell comprising a switching stage and an auxiliary stage, the input of the said auxiliary stage being connected by means of a capacitor, to the output of the said input stage and the output of the said auxiliary stage being connected to the input of the said switching stage.

5. An electronic watch according to claim 4, in which the gate of the first transistor of the said output circuit is connected to the output of the input stage of the said voltage multiplier circuit, and the gate of the second transistor of the said output circuit is connected to the input of the auxiliary stage of the last cell of the said voltage multiplier circuit.

6. An electronic watch according to claim 4, in which the gate of the first transistor of the said output circuit is connected to the output of an auxiliary inverter, fed by the said battery, the input of which auxiliary inverter is connected to the output of the input stage of the said voltage multiplier circuit, and the gate of the second transistor of the said output circuit is connected to the output of the auxiliary stage of the last cell of the said voltage multiplier circuit.

7. An electronic watch according to claim 4, in which the voltage multiplier circuit comprises an input stage and at least one capacitive multiplication cell, each cell comprising a switching stage and an auxiliary stage including two other MOS transistors, the gate of the first of the said other transistors being connected to the output of the said input stage, and the gate of the second of the said other transistors being connected, on the one hand, by means of a capacitor, to the output of the said input stage and, on the other hand, directly to the output of the switching stage.

8. An electronic watch according to claim 7, in which the gate of the first transistor of the output stage of the interface circuit is connected to the drain of the first transistor of the auxiliary stage of the first capacitive multiplication cell, and the gate of the second transistor of the said output stage is connected to the drain of the second transistor of the auxiliary stage of the last of the said capacitive multiplication cells.

9. An electronic watch according to claim 1 wherein said interface circuit comprises a voltage multiplier which delivers an increased output D.C. voltage; and an output circuit fed by the said output voltage and delivering output pulses with the same frequency as that of the pulses issuing from the $K^{th}$ divider stage and with an increased amplitude, said increased D.C. voltage feeding the following (N−K) stage of said chain as well as said control circuits and said display means, said output pulses of increased amplitude controlling the input of the first of the following (N−K) divider stages with the increased level required by said first following stage fed by the increased output D.C. voltage.

10. An electronic watch according to claim 1, in which said voltage multiplier circuit comprises capacitive components.

* * * * *